United States Patent
Johnson

(10) Patent No.: US 7,044,872 B1
(45) Date of Patent: May 16, 2006

(54) METHODS AND APPARATUS FOR PROVIDING REVERSE DRIVE IN A RECREATIONAL VEHICLE

(75) Inventor: Barry A. Johnson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 32 days.

(21) Appl. No.: 10/327,725

(22) Filed: Dec. 23, 2002

(51) Int. Cl.
*F16H 59/00* (2006.01)
*F16H 63/00* (2006.01)
*F16H 55/56* (2006.01)

(52) U.S. Cl. .......................................... 474/14; 474/21
(58) Field of Classification Search ............ 474/19–21, 474/14, 12, 37; 464/74–76, 83; 192/84–96
See application file for complete search history.

(56) References Cited

U.S. PATENT DOCUMENTS

| | | | |
|---|---|---|---|
| 3,279,270 A | 10/1966 | Pacak | |
| 3,612,014 A | 10/1971 | Tenney | |
| 3,616,706 A * | 11/1971 | Shimamoto | 474/19 |
| 3,625,079 A * | 12/1971 | Hoff | 474/12 |
| 3,698,497 A | 10/1972 | Bombardier | |
| 3,776,354 A | 12/1973 | Duclo et al. | |
| 3,893,350 A | 7/1975 | Gingras | |
| 3,963,083 A | 6/1976 | Reese | |
| 3,967,509 A | 7/1976 | Teal | |
| 3,981,373 A | 9/1976 | Irvine | |
| 3,985,192 A | 10/1976 | Samuelson et al. | |
| 4,069,882 A | 1/1978 | Leonard et al. | |
| 4,173,155 A * | 11/1979 | Togami et al. | 474/19 |
| 4,216,678 A | 8/1980 | Butterfield et al. | |
| 4,328,879 A * | 5/1982 | Tone | 464/74 |
| 4,378,221 A | 3/1983 | Huff et al. | |
| 4,585,429 A | 4/1986 | Marier | |
| 4,592,737 A | 6/1986 | Dhont | |
| 4,711,135 A * | 12/1987 | Horiuchi et al. | 74/574 |
| 5,038,881 A | 8/1991 | Wysocki et al. | |
| 5,161,489 A | 11/1992 | Morooka | |
| 5,254,041 A * | 10/1993 | Duclo | 474/14 |
| 5,403,240 A * | 4/1995 | Smith et al. | 474/8 |
| 5,516,333 A | 5/1996 | Benson | |
| 5,538,120 A | 7/1996 | Berardicurti | |
| 5,660,245 A | 8/1997 | Marier et al. | |
| 5,685,387 A * | 11/1997 | Rioux et al. | 180/190 |
| 5,720,681 A | 2/1998 | Benson | |
| 5,782,210 A | 7/1998 | Venturoli et al. | |
| 5,794,574 A | 8/1998 | Bostelmann et al. | |
| 5,964,191 A | 10/1999 | Hata | |
| 5,967,286 A * | 10/1999 | Hokanson et al. | 192/110 R |
| 6,039,010 A | 3/2000 | Hata | |
| 6,044,807 A | 4/2000 | Hata | |
| 6,070,683 A * | 6/2000 | Izumi et al. | 180/190 |
| 6,086,014 A * | 7/2000 | Bragg, Jr. | 244/2 |
| 6,098,574 A | 8/2000 | Arakawa et al. | |
| 6,120,399 A | 9/2000 | Okeson et al. | |

(Continued)

*Primary Examiner*—Marcus Charles
(74) *Attorney, Agent, or Firm*—Baker & Daniels LLP

(57) ABSTRACT

A vehicle with a continuously variable transmission (continuously variable transmission) includes a torque responsive clutch having a cam and at least one coupling. The cam has a plurality of projecting surfaces, and a plurality of slots being defined between the projecting surfaces. The slots of the cam are used to direct cam followers that move across the slot surfaces as the vehicle is driven forward or in reverse. As the vehicle adjusts from forward to reverse or vice versa, the cam followers may jump from one side of the slot to the other.

18 Claims, 7 Drawing Sheets

U.S. PATENT DOCUMENTS

| | | | |
|---|---|---|---|
| 6,131,477 A * | 10/2000 | Gaydek et al. | 464/76 |
| 6,146,295 A | 11/2000 | Mor et al. | |
| 6,174,260 B1 | 1/2001 | Tsukada et al. | |
| 6,234,119 B1 | 5/2001 | Tsukada et al. | |
| 6,237,546 B1 | 5/2001 | Gander | |
| 6,379,274 B1 * | 4/2002 | Robert | 474/19 |
| 6,413,178 B1 * | 7/2002 | Chamberland | 474/19 |
| 6,569,043 B1 * | 5/2003 | Younggren et al. | 474/19 |

* cited by examiner

METHODS AND APPARATUS FOR PROVIDING REVERSE DRIVE IN A RECREATIONAL VEHICLE

RELATED APPLICATIONS

The present application is related to a U.S. patent application Ser. No. 10/329,047 entitled "Continuously Variable Transmission with Two Piece Cam" by the same inventor and filed on an even date herewith. The entire disclosure of the above mentioned patent application is hereby incorporated by reference.

TECHNICAL FIELD

The present invention relates generally to recreational vehicles. More particularly, the present invention relates to drive systems for use with recreational vehicles.

BACKGROUND OF THE INVENTION

In recent years, recreational vehicles (e.g., snowmobiles) have gained widespread popularity. Snowmobiles are commonly used in hunting, trail riding and utility applications such as the wide variety of maintenance activities which take place on a farm. Perhaps the most common snowmobile application is trail riding. Trail riding on a snowmobile allows a snowmobile enthusiast to travel through areas that are not accessible by ordinary automobiles particularly during the winter months. Modern snowmobiles, can cover ground very rapidly and can cover great distances. Frequently, snowmobile enthusiasts ride their snowmobile for many hours straight and cover many miles. If the rider is subjected to excessive jarring while traveling over rough terrain, operator fatigue may result particularly during a long ride. During such long rides, a snowmobile may be used to carry a rider through a wide variety of terrain.

SUMMARY OF THE INVENTION

The present invention relates generally to recreational vehicles. More particularly, the present invention relates to drive systems for use with recreational vehicles. A vehicle in accordance with an exemplary embodiment of the present invention comprises an engine capable of rotating a crankshaft in a first direction and a second direction. A crankshaft of the engine is coupled to a drive shaft of the vehicle by a drive train. In one aspect of the present invention, the drivetrain includes a coupling linking a first rotating component of the drivetrain to a second rotating component of the drivetrain. The coupling may be advantageously adapted to absorb shock when the rotation of the crankshaft is changed from the first direction to the second direction or from the second direction to the first direction. In some exemplary implementations of the present invention, the first rotating component comprises a cam and the second rotating component comprises a cam mount.

In some exemplary implementations of the present invention, the coupling comprises at least one fastener for attaching the cam to the cam mount and an elastically deformable intermediate member. The elastically deformable intermediate member may advantageously comprise a sleeve having a bore dimensioned to receive the connecting fastener, and an outer surface dimensioned to engage the coupling portion of the cam. In some advantageous implementations, a body of the deformable intermediate member comprises polyurethane. Also in some advantageous implementations, the coupling portion of the cam comprises a slot. In some cases, the cam mount may comprise a plate that is fixed to a shaft.

A drive in accordance with an additional exemplary embodiment of the present invention comprises a cam having at least one coupling portion and at least one cam follower coupled to a sheave. The at least one cam follower preferably engages a camming surface of the cam. In some advantageous implementations, the drive further includes a coupling extending between the at least one coupling portion of the cam and a cam mount. In one aspect of the present invention, the coupling absorbs shock when a rotational direction of the sheave is changed from a first direction to a second direction or from the second direction to the first direction.

Various methods in accordance with the present invention may be used to create a vehicle providing an enhanced riding experience. One exemplary method in accordance with the present invention includes the steps of providing a new cam having a base and an elastically deformable intermediate member disposed within at least one coupling portion of the new cam. The elastically deformable intermediate member may comprise a sleeve having a bore extending therethrough to receive a connecting fastener. The method further includes the steps of removing an old cam from a continuously variable transmission, installing the new cam onto the continuously variable transmission, and securing the new cam with the connecting fastener.

Various methods in accordance with the present invention may also be used to dampen a continuously variable transmission having a cam fixed to a base by a connecting fastener. One exemplary method in accordance with the present invention comprises the steps of removing the cam from the continuously variable transmission by loosening a fastener and removing material from the cam to create a coupling portion of the cam that is dimensioned to receive an elastically deformable intermediate member. An elastically deformable intermediate member may be inserted into the coupling portion of the cam. A connecting fastener may be inserted through a bore of the elastically deformable coupling. The cam may be secured to the base with the connecting fastener. In some implementations of the present invention, the coupling portion comprises a slot defined by the base. Also in some implementations of the present invention, the elastically deformable intermediate member comprises polyurethane.

DETAILED DESCRIPTION OF THE INVENTION

Figure 1:
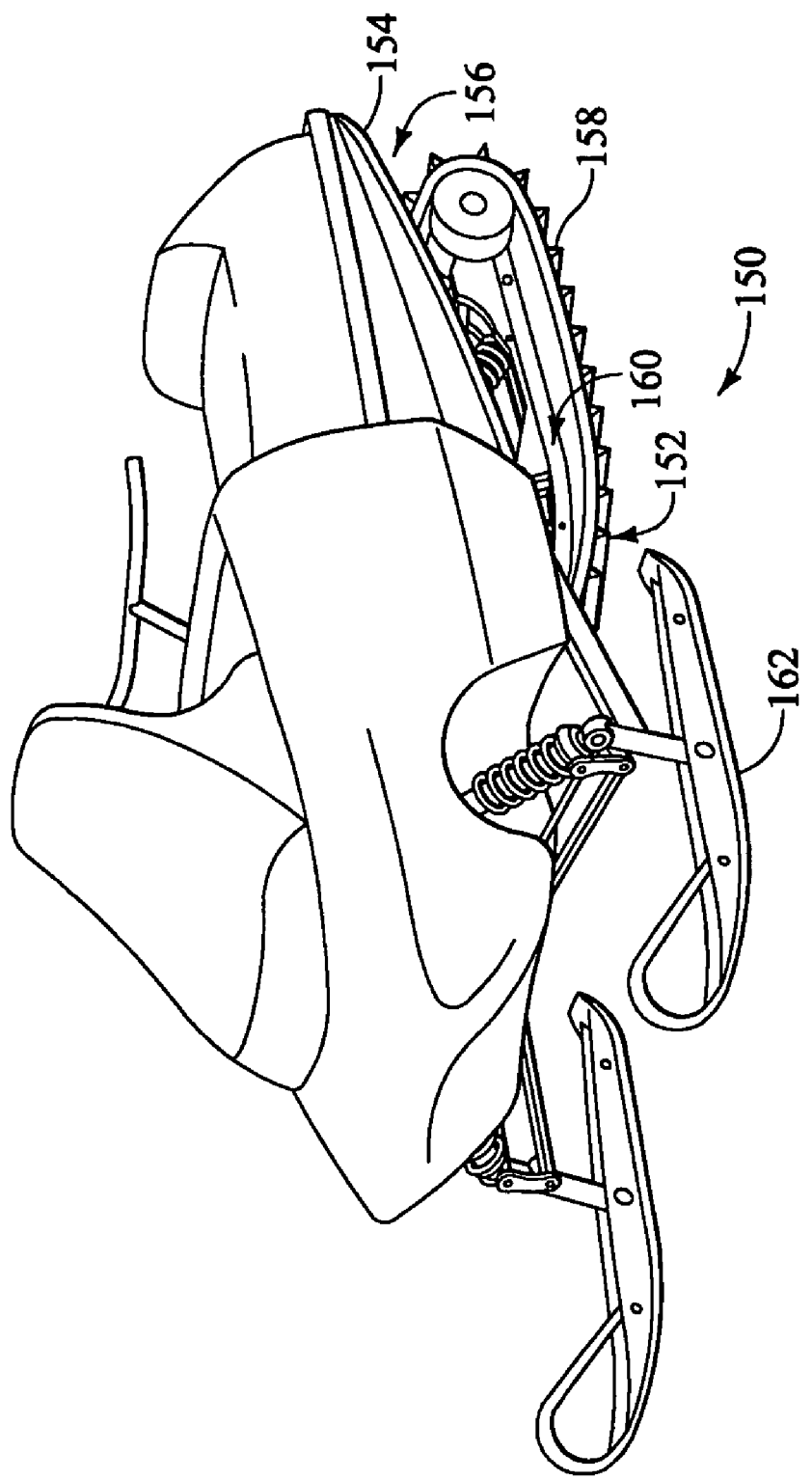
FIG. 1 is a perspective view of a snowmobile including a drive system in accordance with an exemplary embodiment of the present invention.

The following detailed description should be read with reference to the drawings, in which like elements in different drawings are numbered identically. The drawings, which are not necessarily to scale, depict selected embodiments and are not intended to limit the scope of the invention. Accordingly, it is to be understood that the invention is not limited in its application to the details of construction and the arrangements of components set forth in the following description or illustrated in the drawings.

FIG. 1 is a perspective view of a snowmobile 150 including a drive system 152 in accordance with an exemplary embodiment of the present invention. Snowmobile 150 has a chassis 154 defining a tunnel 156. In the embodiment of FIG. 1, a drive track 158 can be seen extending from tunnel 156. In the embodiment of FIG. 1, drive track 158 comprises an endless loop that is supported by a rear suspension 160. In a preferred embodiment, drive track 158 is operatively connected to an engine by a drivetrain so that drive track 158 may be used to propel snowmobile 150. In some embodiments of the present invention drive track 158 may be used to propel snowmobile 150 in both a forward direction and a reverse direction. In FIG. 1, it may also be appreciated that snowmobile 150 includes a plurality of skis 162. Although a snowmobile is illustrated in FIG. 1, it is the be appreciated that a drive system in accordance with the present invention may be used in conjunction with various types of vehicles. Examples of such vehicles include ATVs, golf carts and the like.

Figure 2:
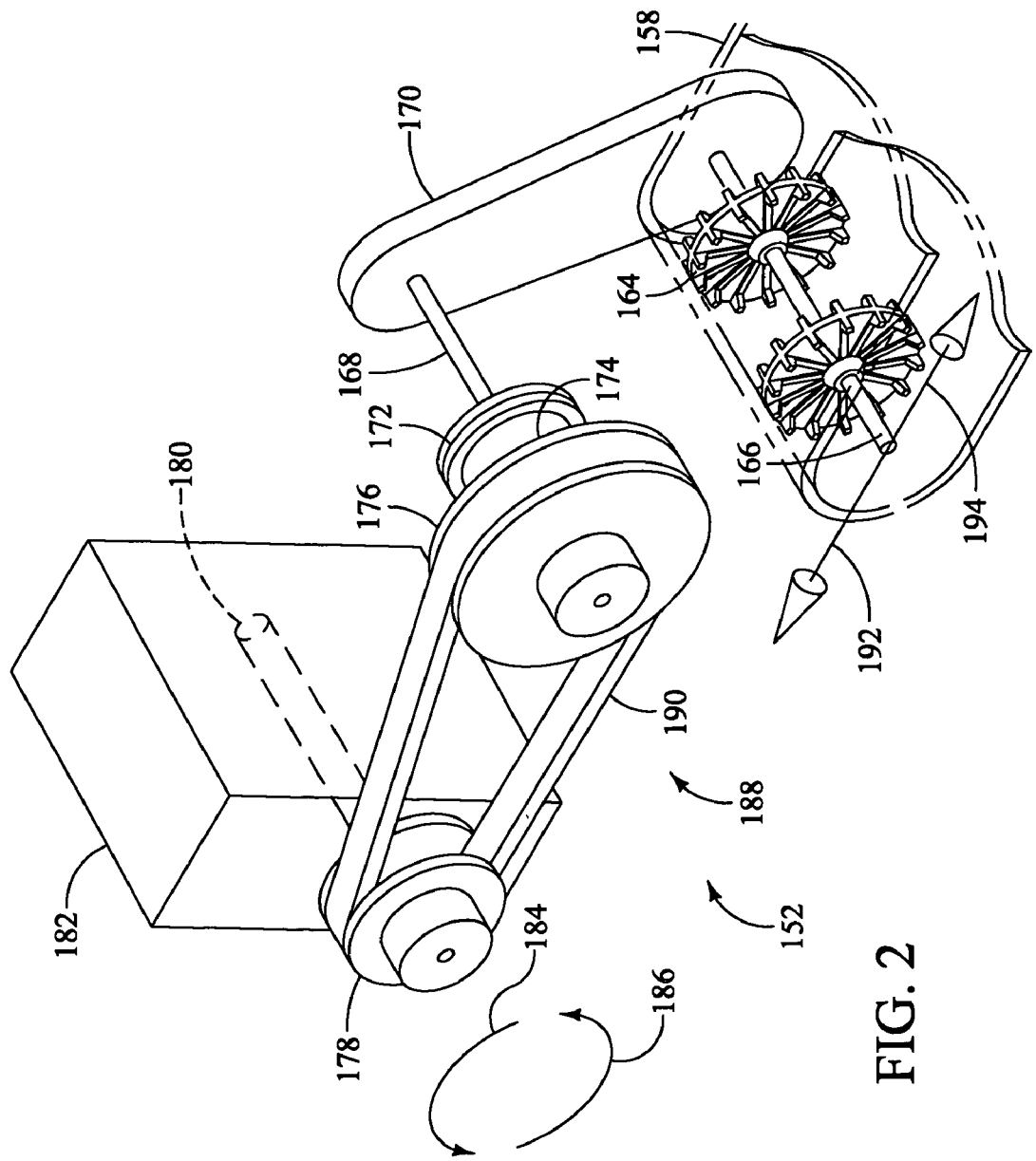
FIG. 2 is a perspective view of a drive system in accordance with an exemplary embodiment of the present invention.

FIG. 2 is a perspective view of a drive system 152 in accordance with an exemplary embodiment of the present invention. Drive system 152 of FIG. 2 may be used, for example, to propel a snowmobile such as the one illustrated in the previous figure. Drive system 152 includes a drive track 158 that is illustrated using phantom lines in FIG. 2. Drive track 158 may be driven by two drive sprockets 164 that are fixed to a drive shaft 166. Drive shaft 166 is preferably adapted to be used to urge motion of drive track 158, such that drive shaft 166 and drive track 158 propel a vehicle.

Drive system 152 of FIG. 2 also includes a jack shaft 168. In the embodiment of FIG. 2, jack shaft 168 and drive shaft 166 are connected to one another by a speed reduction mechanism 170. In a preferred embodiment, speed reduction mechanism 170 is configured to provide a desired reduction in rotational velocity. Speed reduction mechanism 170 may comprise various elements without deviating from the spirit and scope of the present invention. Examples of elements which may be suitable in some applications include gears, sprockets, belts and chains.

A cam mount 172 is fixed to jack shaft 168 in the embodiment of FIG. 2. A cam 174 is coupled to cam mount 172. Cam 174 interfaces with a driven clutch 176. Driven clutch 176 is connected to a drive clutch 178 by a drive belt 190. In the embodiment of FIG. 2, drive clutch 178 is fixed to a crankshaft 180 of an engine 182. In a preferred embodiment, engine 182 is capable of rotating crankshaft 180 in both a first rotational direction 184 and a second rotational direction 186.

With reference to FIG. 2, it may be appreciated that rotation of crankshaft 180 is transferred via a drivetrain 188 to drive shaft 166 so as to cause rotation of drive shaft 166. In the embodiment of FIG. 2, drivetrain 188 comprises drive clutch 178, drive belt 190, driven clutch 176, jack shaft 168, and speed reduction mechanism 170. Drive shaft 166 causes movement of drive track 158 such that drive track 158 propels a vehicle. When crankshaft 180 is rotated in a first rotational direction 184 the vehicle is propelled in a forward direction 192. When crankshaft 180 is rotated in a second rotational direction 186, vehicle is propelled in a reverse direction 194.

Figure 3:
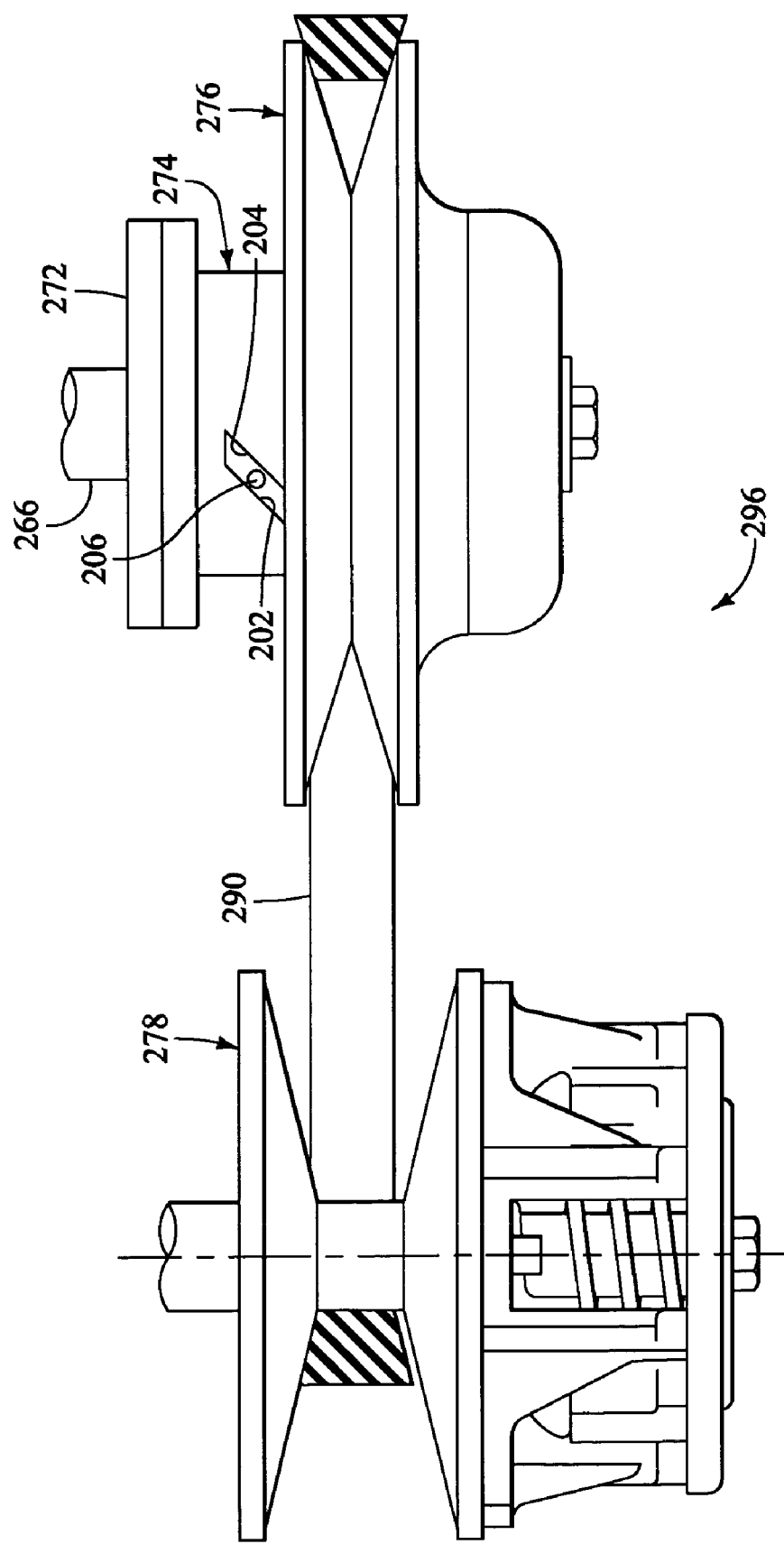
FIG. 3 is a plan view of a continuously variable transmission in accordance with an exemplary embodiment of the present invention.

FIG. 3 is a plan view of a continuously variable transmission 296 in accordance with an exemplary embodiment of the present invention. Continuously variable transmission 296 includes a drive clutch 278, a driven clutch 276, and an endless drive belt 290 disposed about the drive clutch 278 and driven clutch 276. Driven clutch 276 includes a pair of opposed sheaves which together define a generally V-shaped "pulley" within which drive belt 290 rides. One of the sheaves is axially movable (i.e., movable in the direction parallel to the axis of driven clutch 276), and the other sheave is axially stationary.

Continuously variable transmission 296 includes a cam 274 that is preferably adapted to urge the sheaves of driven clutch 276 toward one another. In the embodiment of FIG. 3, cam 274 is coupled to a cam mount 272. Also in the embodiment of FIG. 3, cam mount 272 is fixed to a drive shaft 266. The drive clutch 278 is similarly configured from a pair of opposed sheaves, one being axially movable and the other being axially stationary. As shown in FIG. 3, cam 274 includes a first cam surface 202 which contacts a cam follower 206 when cam 274 is turning in a first direction. Also as shown in FIG. 3, cam 274 includes a second cam surface 204 which contacts a cam follower 206 when cam 274 is turning in a second direction.

Figure 4:
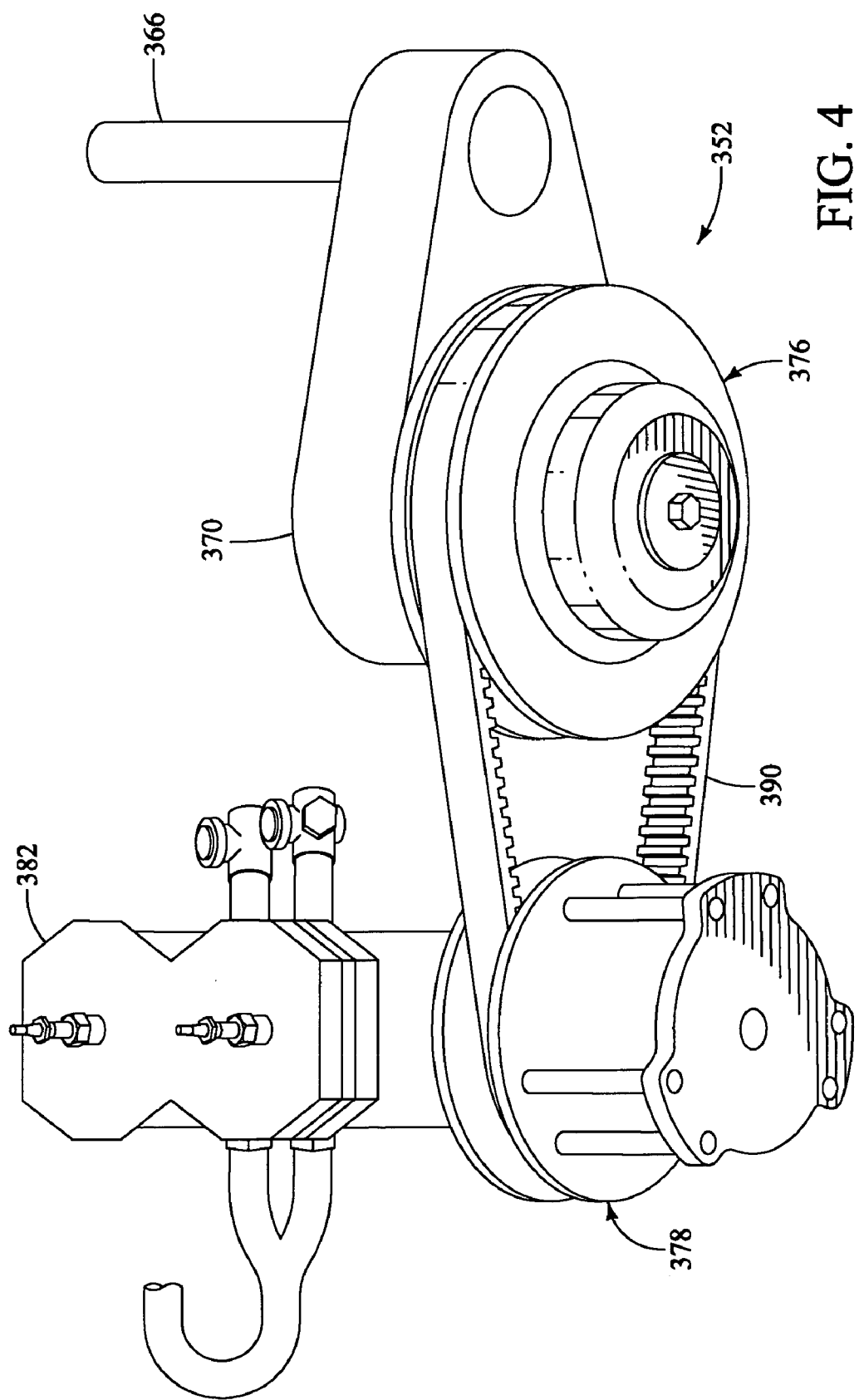
FIG. 4 is a perspective view of a drive system in accordance with an additional exemplary embodiment of the present invention.

FIG. 4 is a perspective view of a drive system 352 in accordance with an additional exemplary embodiment of the present invention. Drive system 352 of FIG. 4 includes an engine 382 and a drive clutch 378 that is fixed to a crankshaft of engine 382. In a preferred embodiment, engine 382 is capable of rotating the crankshaft in both a first direction and a second direction that is different from the first direction. Various methods and apparatus may be used to rotate the crankshaft in a first direction and a second direction without deviating from the spirit and scope of the present invention. Examples of methods and apparatus that may be suitable in some applications can be found in U.S. Pat. Nos. 5,161,489; 5,782,210; 5,794,574; 5,964,191; 6,039,010; 6,044,807; 6,098,574; 6,234,119; and 6,237,546. The entire disclosure of each of these U.S. patents is herby incorporated by reference.

Drive clutch 378 is connected to a driven clutch 376 by a drive belt 390. Driven clutch 376 is connected to a drive shaft 366 by a speed reduction mechanism 370. In a preferred embodiment, speed reduction mechanism 370 is configured to provide a desired reduction in rotational velocity. Speed reduction mechanism 370 may comprise various elements without deviating from the spirit and scope of the present invention. Examples of elements which may be suitable in some applications include gears, sprockets, belts and chains.

Figure 5:
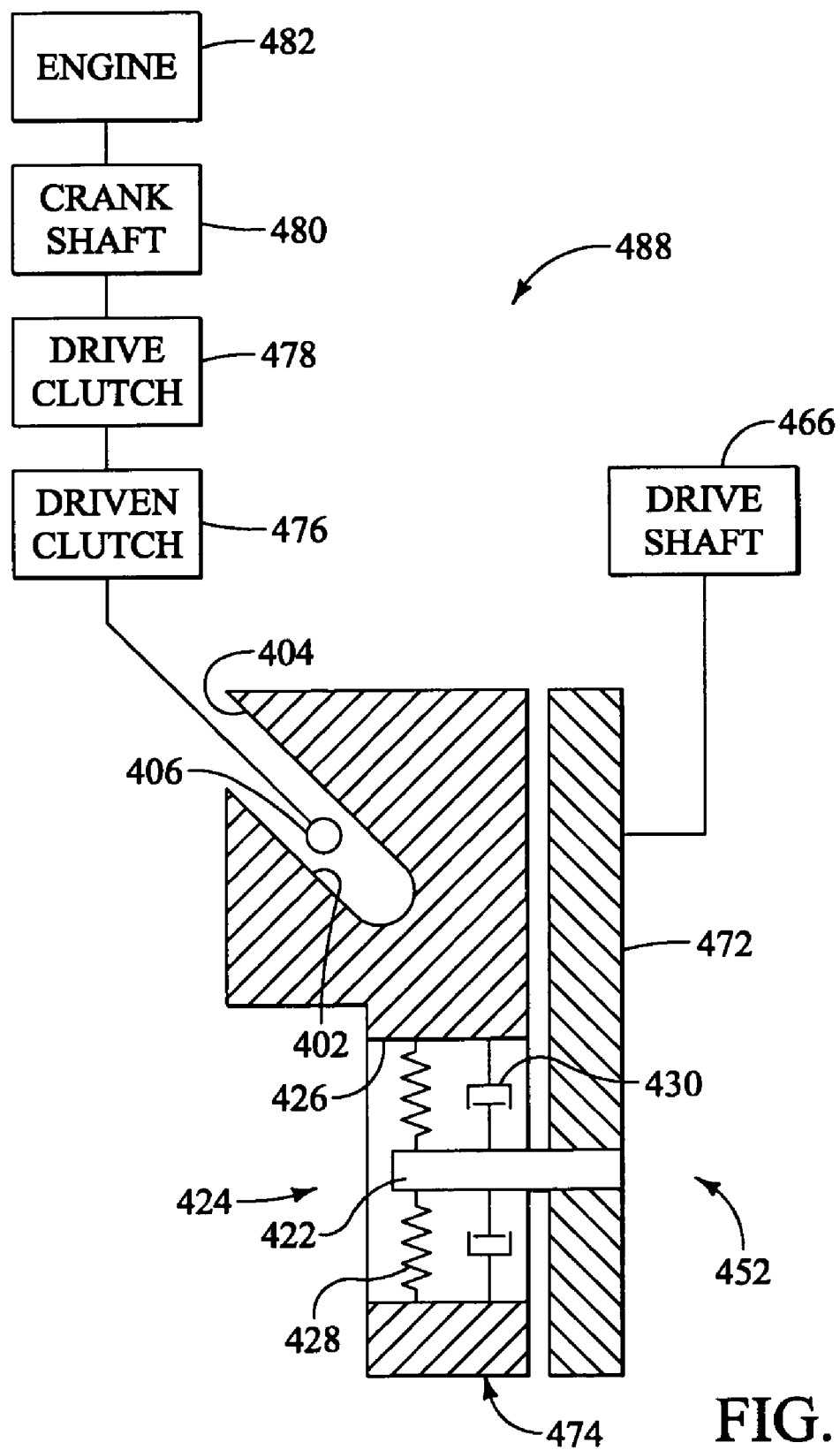
FIG. 5 is a diagrammatic view of a drive system in accordance with an additional exemplary embodiment of the present invention.

FIG. 5 is a diagrammatic view of a drive system 452 in accordance with an additional exemplary embodiment of the present invention. Drive system 452 includes an engine 482. In the exemplary embodiment of FIG. 5, engine 482 is capable of rotating a crankshaft 480 in a first direction and a second direction. Crankshaft 480 of engine 482 is connected to a drive shaft 466 via a drivetrain 488. In the embodiment of FIG. 5, drivetrain 488 includes a drive clutch 478, a driven clutch 476, a cam 474, and a cam follower 406.

In the embodiment of FIG. 5, cam 474 is coupled to drive shaft 466 via a cam mount 472 and a coupling 424. As shown in FIG. 5, cam 474 includes a first cam surface 402 which contacts a cam follower 406 when crankshaft 480 is turning in a first direction. Also as shown in FIG. 5, cam 474 includes a second cam surface 404 which contacts a cam follower 406 when crankshaft 480 is turning in a second direction. In some advantageous embodiments of the present invention, coupling 424 is capable of absorbing shock when the rotation of the crankshaft 480 is changed from the first direction to the second direction or from the second direction to the first direction. As shown in FIG. 5, coupling 424 extends between a coupling portion 426 of cam 474 and a fastener 422. In the embodiment of FIG. 5, coupling 424 comprises a spring 428 and a damper 430.

Figure 6:
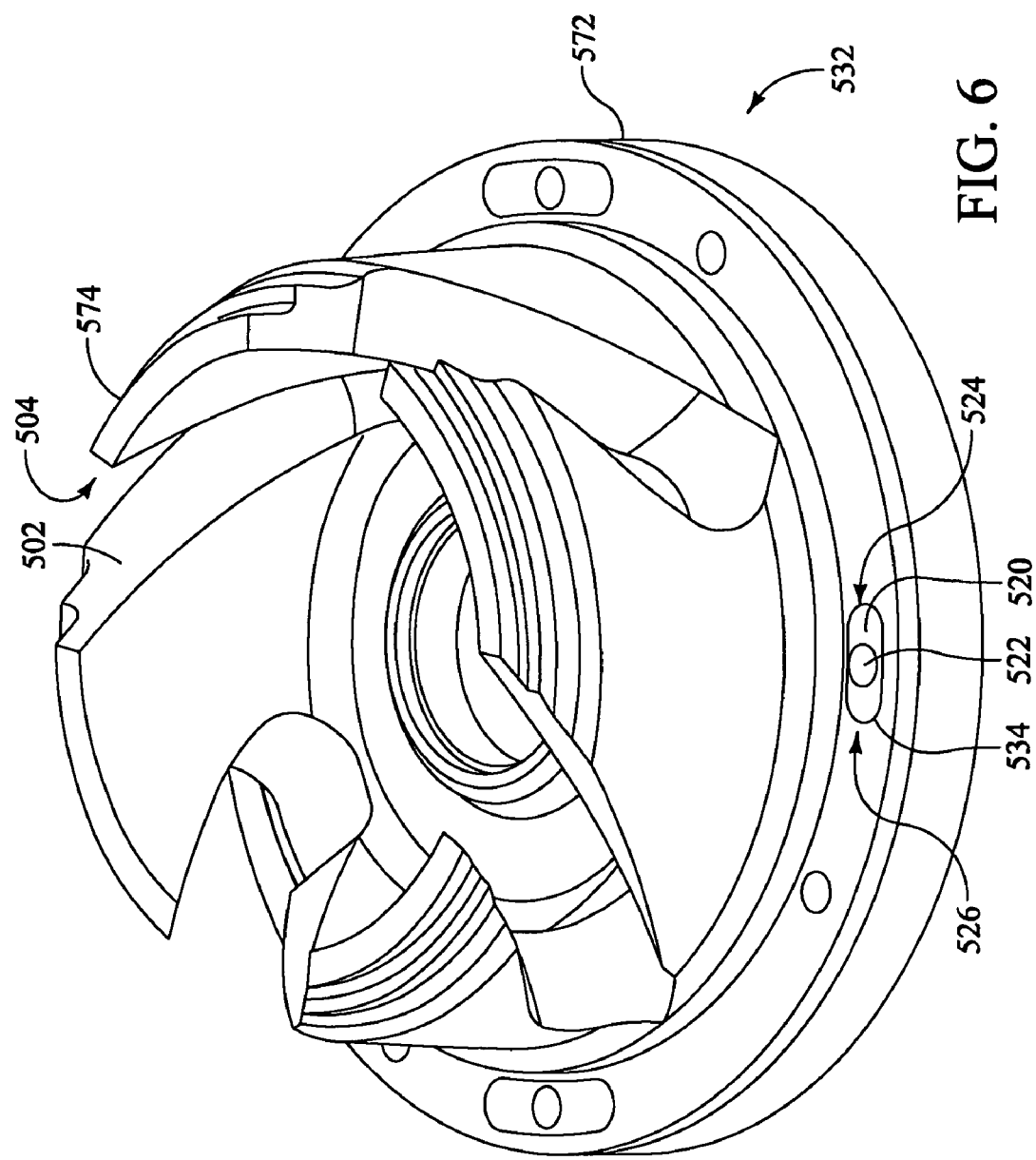
FIG. 6 is a perspective view of a cam assembly in accordance with an additional exemplary embodiment of the present invention.

FIG. 6 is a perspective view of a cam assembly 532 in accordance with an additional exemplary embodiment of the present invention. Cam assembly 532 includes a cam 574 that is coupled to a cam mount 572 at a coupling 524. In the embodiment of FIG. 6, coupling 524 comprises an intermediate member 520 which extends between a coupling portion 526 of cam 574 and a fastener 522. In the embodiment of FIG. 6, coupling portion 526 of cam 574 includes a slot 534 which is dimensioned to receive intermediate member 520.

In the embodiment of FIG. 6, cam 574 includes a first cam surface 502 which is preferably dimensioned to contact a cam follower when cam 574 is turning in a first direction. Also as shown in FIG. 6, cam 574 includes a second cam surface 504 which is preferably dimensioned to contact a cam follower when cam 574 is turning in a second direction. In some advantageous embodiments of the present invention, coupling 524 is capable of absorbing shock when the rotation of cam 574 is changed from the first direction to the second direction or from the second direction to the first direction.

Figure 7:
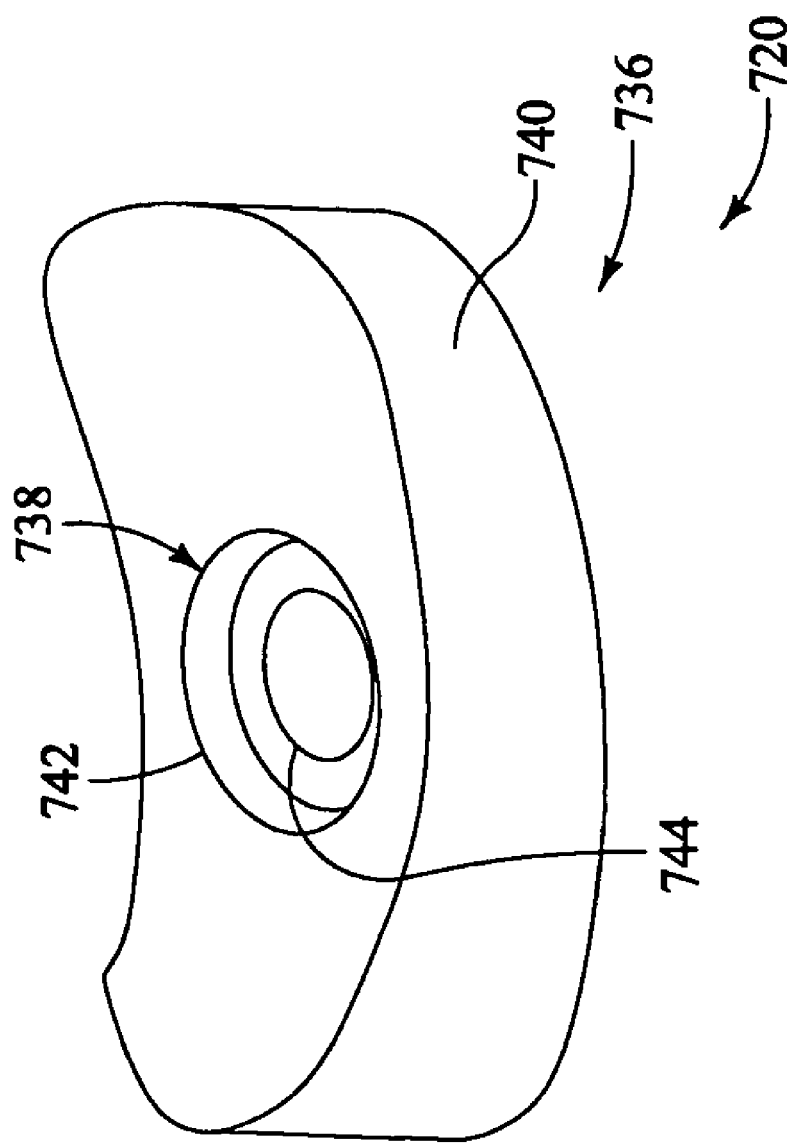
FIG. 7 is a perspective view of an intermediate member in accordance with an exemplary embodiment of the present invention.

FIG. 7 is a perspective view of intermediate member 720 in accordance with an exemplary embodiment of the present invention. With reference to FIG. 7, it may be appreciated that intermediate member 720 comprises a body 736 defining a bore 738. Bore 738 is preferably dimensioned to receive a connecting fastener. In the embodiment of FIG. 7, bore 738 includes a counter bore 742 and a through hole 744. In a preferred embodiment, an outer surface 740 of intermediate member 720 is dimensioned to engage a coupling portion of a cam. In the embodiment of FIG. 7, body 736 of intermediate member 720 has a generally arcuate shape.

In some useful embodiments of the present invention, body 736 of intermediate member 720 comprises a reversibly deformable material. For example, intermediate member 720 may comprise an elastomeric material. The term elastomeric generally refers to a rubberlike material (e.g., a material which can experience about a 7% deformation and return to the undeformed configuration). Examples of elastomeric materials include rubber (e.g., natural rubber, silicone rubber, nitrile rubber, polysulfide rubber, etc.), thermoplastic elastomer (TPE), butyl, polyurethane, and neoprene.

The complete disclosures of all patents, patent applications, and publications are hereby incorporated by reference as if individually incorporated. Having thus described the various exemplary embodiments of the present invention, those of skill in the art will readily appreciate that yet other embodiments may be made and used within the scope of the claims hereto attached. Thus, it is to be understood that this disclosure is, in many respects, only illustrative. Changes may be made in details, particularly in matters of shape, size, and arrangement of parts without exceeding the invention's scope which is, of course, defined in the language in which the appended claims are expressed.

What is claimed is:

1. A drive comprising:
   a cam having at least one coupling portion;
   at least one cam follower coupled to a sheave;
   the at least one cam follower for engaging a camming surface of the cam;
   a coupling extending between the at least one coupling portion of the cam and a cam mount;
   the coupling absorbing a shock induced by the cam follower engaging the camming surface when a rotational direction of the sheave is changed from a first direction to a second direction or from the second direction to the first direction;
   the coupling comprising an elastically deformable intermediate member;
   wherein the elastically deformable intermediate member comprises a sleeve having a bore extending therethrough;
   the sleeve having an outer surface dimensioned to engage the coupling portion of the cam;
   the bore being dimensioned to receive a fastener; and
   the fastener extending through the bore of the sleeve and connecting to the cam mount.

2. The drive according to claim 1, wherein the elastically deformable intermediate member comprises polyurethane.

3. The drive according to claim 1, wherein the coupling portion of the cam comprises a slot.

4. The drive according to claim 3, wherein the slot is defined by a base of the cam.

5. The drive according to claim 1, wherein the cam mount comprises a plate that is fixed to a shaft.

6. The drive according to claim 1, wherein the elastically deformable intermediate member is capable of assuming a deformed shape while absorbing shock.

7. The drive according to claim 1, wherein the coupling further comprises a spring.

8. The drive according to claim 1, wherein the coupling further comprises a damper.

9. A method for assembling a drive, comprising the steps of:
   providing a cam having a base, the base having at least one coupling portion;
   providing an elastically deformable intermediate member comprising a sleeve having a bore extending therethrough to receive a connecting fastener;
   inserting the elastically deformable intermediate member into the coupling portion of the cam to absorb a shock induced by a cam follower engaging a camming surface of the cam when a rotational direction of a sheave, to which the cam follower is coupled, is changed;
   installing the cam onto a continuously variable transmission; and
   securing the cam with the connecting fastener;
   rotating the sheave in a first direction; and
   changing the rotational direction of the sheave from the first direction to a second direction different than the first direction.

10. The method of claim 9, wherein the coupling portion comprises a slot defined by the base of the cam.

11. The method of claim 9, wherein the elastically deformable intermediate member comprises polyurethane.

12. The method of claim 9, further including the step of inserting a connecting fastener through the bore of the elastically deformable intermediate member to secure the cam.

13. A method of dampening a continuously variable transmission having a cam fixed to a base by a connecting fastener, comprising the steps of:
   removing the cam from the continuously variable transmission by loosening the fastener;
   providing an elastically deformable intermediate member;
   removing material from the cam to create a coupling portion of the cam that is dimensioned to receive the elastically deformable intermediate member;
   inserting the elastically deformable intermediate member into the coupling portion of the cam to absorb a shock induced by a cam follower engaging a camming surface of the cam when a rotational direction of a sheave, to which the cam follower is coupled, is changed;
   inserting the connecting fastener through a bore of the elastically deformable coupling; and
   securing the cam to the base with the connecting fastener.

14. The method of claim 13, wherein the coupling portion comprises a slot defined by the base.

15. The method of claim 13, wherein the elastically deformable intermediate member comprises polyurethane.

16. A cam assembly, comprising:
   a cam mount for coupling the cam assembly to a drive shaft;
   a cam including a coupling slot, a first cam surface for engaging a cam follower, coupled to a sheave, when the sheave is turning in a first direction, and a second cam surface for engaging the cam follower when the sheave is turning in a second direction; and
   an elastically deformable intermediate coupling member disposed within the coupling slot of the cam, and including a bore dimensioned to receive a fastener for connecting the cam to the cam mount, the coupling member adapted to absorb a shock when the cam follower switches engagement from the first cam surface to the second cam surface and from the second cam surface to the first cam surface.

17. The assembly of claim 16, wherein the coupling member has a shape conforming to a shape of the coupling slot of the cam.

18. The assembly of claim 16, wherein the coupling member comprises an elastomeric material.

* * * * *